(12) United States Patent
Gehring et al.

(10) Patent No.: US 12,023,767 B2
(45) Date of Patent: Jul. 2, 2024

(54) METHOD OF MANUFACTURING A MODULAR CLAMPING DEVICE FOR ROTATIONALLY SYMMETRICAL BODIES AND CLAMPING DEVICE MANUFACTURED THEREWITH

(71) Applicant: REISHAUER AG, Wallisellen (CH)

(72) Inventors: Benjamin Gehring, Glattfelden (CH); Saip Semsedini, Hausen (CH); Dominik Michael Stäubli, Zürich (CH); Roman Zimmermann, Döttingen (CH)

(73) Assignee: REISHAUER AG, Wallisellen (CH)

( * ) Notice: Subject to any disclaimer, the term of this patent is extended or adjusted under 35 U.S.C. 154(b) by 0 days.

(21) Appl. No.: 17/693,970

(22) Filed: Mar. 14, 2022

(65) Prior Publication Data
US 2022/0288733 A1    Sep. 15, 2022

(30) Foreign Application Priority Data

Mar. 15, 2021 (CH) .................................. 00277/21

(51) Int. Cl.
*B23Q 1/70* (2006.01)
*B23P 15/00* (2006.01)

(52) U.S. Cl.
CPC ............... *B23Q 1/70* (2013.01); *B23P 15/00* (2013.01)

(58) Field of Classification Search
CPC ............ B23B 2231/04; B23B 2231/26; B23B 31/302; B23B 31/305; B23B 31/40; B23B 31/402; B23F 23/06; B23P 15/00; B23Q 1/70; B23Q 3/12
See application file for complete search history.

(56) References Cited

FOREIGN PATENT DOCUMENTS

| CN | 109848488 A | 6/2019 |
|---|---|---|
| CN | 110 449 615 A | 11/2019 |
| DE | 31 16 289 A1 | 11/1982 |
| DE | 34 07 315 A1 | 9/1985 |

OTHER PUBLICATIONS

"Schunk Hydraulic Expansion Technology-Customer-specific Solutions", pp. 1-68.
"Reishauer Clamping Systems hydraulically expanding", p. 2.
"Let's get clamping" in the brochure "Liebherr Gear Technology and Automation Systems 2020/2021", pp. 14-15.
Search Report for CH 2772021 dated Jun. 29, 2021.
Reishauer, "Reishauer Clamping Systems mechanically expanding", 2 pages.

*Primary Examiner* — Moshe Wilensky
(74) *Attorney, Agent, or Firm* — Sughrue Mion, PLLC

(57) ABSTRACT

A method of manufacturing a modular clamping device for clamping a rotationally symmetrical body on a spindle head of a motor spindle is disclosed. The modular clamping device includes a clamping element and a first intermediate piece. In the method, a first intermediate piece assembly (22) is provided having a plurality of prefabricated, standardized first standard intermediate pieces. The first intermediate piece (210) is selected from the first intermediate piece assortment (22). The clamping element is fabricated, and the first intermediate piece is positioned relative to the clamping element such that the first intermediate piece is positioned axially between the spindle head and the clamping element when the clamping device is mounted to the spindle head.

15 Claims, 5 Drawing Sheets

METHOD OF MANUFACTURING A MODULAR CLAMPING DEVICE FOR ROTATIONALLY SYMMETRICAL BODIES AND CLAMPING DEVICE MANUFACTURED THEREWITH

TECHNICAL FIELD

The present invention relates to a method of manufacturing a modular clamping device for clamping a rotationally symmetrical body ("rotating part") on a spindle head of a motor spindle, and to a clamping device manufactured therewith.

PRIOR ART

In the machining of rotationally symmetrical workpieces, especially gears, the workpiece to be machined is usually arranged so as to be rotatable on a motor spindle. For fast and precise clamping on the motor spindle, a clamping device is used, which is rigidly connected to the rotatable spindle head of the motor spindle.

A gear usually has a central bore along its longitudinal axis, and the clamping device establishes a non-positive connection with the inner boundary wall of the central bore. Two different types of clamping devices with different operating principles are known for this purpose: on the one hand hydraulic expansion arbors, which have an expansion sleeve that expands outward under hydraulic pressure, and on the other hand mechanical clamping arbors, which are expanded by mechanical forces. Hydraulic or mechanical clamping devices in a wide variety of embodiments are also known for workpieces without a central bore.

In gear cutting technology, clamping devices are traditionally configured specifically for the workpiece. For example, the type, shape and size of the workpiece as well as the requirements of the respective machining process are taken into account. For example, workpieces with a large bore diameter require a different clamping device than workpieces with a small bore diameter, or workpieces with a through bore of constant cross-section require a different clamping device than workpieces with a stepped or undercut bore whose cross-section changes along the workpiece axis. The configured clamping device can therefore only be used for suitable workpieces. Multiple use for other workpieces is not possible or only within very narrow limits (e.g. by using so-called intermediate sleeves). Due to the individual clamping solutions, a high planning effort and a high level of vertical integration of manufacture are required, which leads to a high manufacturing risk, high manufacturing costs and long delivery times.

The brochures "REISHAUER Clamping Systems hydraulically expanding" and "REISHAUER Clamping Systems mechanically expanding", downloaded from www.reishauer.com on Dec. 2, 2021, each disclose a clamping device constructed in two parts. A hydraulic expanding arbor or a mechanically expanding arbor is mounted on a base unit. The base unit provides a releasable connection to the spindle head. The interface between the base unit and the arbor is standardized. This allows the clamping device to be flexibly adapted to different spindle heads. The actual clamping arbor, on the other hand, is configured to be workpiece-specific.

The article "Let's get clamping" in the brochure "LIEBHERR Gear Technology and Automation Systems 2020/2021", pages 14-15, downloaded from www.liebherr.com on Feb. 12, 2021, discloses a segmented clamping device with a mechanical clamping element.

Depending on the circumstances, clamping devices can have a considerable length. In the case of hydraulic clamping devices, this then often requires very long hydraulic bores for the hydraulic fluid.

It is known to provide a pneumatic seat checking device on clamping devices. For this purpose, a measurement nozzle is arranged in a support surface for the workpiece, which is pressurized with compressed air. When the workpiece rests correctly on the support surface, it covers the measurement nozzle. By monitoring the flow or pressure of the compressed air, the correct support of the workpiece can be checked. Bores are also required in the clamping device for the pneumatic seat check, and these can become very long. However, long bores are disadvantageous in terms of manufacturing.

SUMMARY OF THE INVENTION

It is an object of the present invention to provide a method for simple and rapid manufacturing of a clamping device which permits easy adaptation to different rotating parts to be clamped, which facilitates standardization and which, by its design, makes it possible to avoid long bores.

A method is disclosed for manufacturing a modular clamping device for clamping a rotationally symmetrical body on a spindle head of a motor spindle to drive the rotationally symmetrical body to rotate about a longitudinal axis of the clamping device. The modular clamping device has a clamping element configured to establish a clamping connection with the rotationally symmetrical body, and a first intermediate piece. The method comprises the steps of:

provision of a first intermediate piece assortment comprising a plurality of prefabricated, standardized first standard intermediate pieces, each of said first standard intermediate pieces having a proximal end and a distal end, wherein each of said first standard intermediate pieces provides at its proximal end an interface to the spindle head or to a base unit arranged on the spindle head, and wherein each of the first standard intermediate pieces provides at its distal end an interface for a second intermediate piece or for a clamping element, the latter interfaces differing within the first intermediate piece assortment, in particular with regard to their radial dimensions and/or their hole pattern;

selecting the first intermediate piece from the first intermediate piece assortment;

manufacturing the clamping element, and arranging the selected first intermediate piece relative to the clamping element in such a way that the first intermediate piece is arranged in axial direction with respect to the longitudinal axis between the spindle head and the clamping element when the clamping device is mounted to the spindle head.

On the one hand, this in particular enables a rigid connection to be established between the spindle head and the selected first intermediate piece, if necessary via a base unit arranged therebetween. On the other hand, a rigid connection is established between the selected first intermediate piece and the clamping element, if necessary via one or more further intermediate pieces.

In the present document, a rigid connection is defined as a connection in which relative movement of the connection partners is blocked in all degrees of freedom.

The clamping device may further comprise a second intermediate piece. In such a case, the method may further comprise the steps of:
- providing a second intermediate piece assortment comprising a plurality of prefabricated, standardized second standard intermediate pieces, each of said second standard intermediate pieces having a proximal end and a distal end, wherein each of said second standard intermediate pieces provides an interface at its proximal end to a first standard intermediate piece of said first intermediate piece assortment, and wherein each of the second standard intermediate pieces provides an interface for the clamping element or a further intermediate piece, wherein the standard intermediate pieces within the second intermediate piece assortment differ, for example, with respect to their length along the longitudinal axis;
- selecting the second intermediate piece from the second intermediate piece assortment; and
- arranging the second intermediate piece in axial direction between the selected first intermediate piece and the clamping element.

The modular clamping device may further comprise a base unit. In such a case, the method may further comprise:
- providing a base unit assortment comprising a plurality of prefabricated standardized base units, each of the standard base units having a proximal end and a distal end, wherein each of the standard base units provides an interface to a spindle head at its proximal end, and wherein each of said standard base units provides an interface to a first standard intermediate from said first intermediate assortment at its distal end;
- selecting the base unit from the base unit assortment; and
- arranging the selected base unit relative to the first intermediate piece such that the base unit is arranged in axial direction between the spindle head and the selected first intermediate piece when the clamping device is mounted to the spindle head.

This means that only the clamping element is manufactured specifically for the body to be clamped. The base unit and the intermediate pieces, however, are taken according to a modular system from assortments of standardized components that are specifically configured to be compatible with each other. This greatly simplifies manufacturing. At the same time, process reliability is improved and the time required for manufacturing is reduced.

The clamping element may be a hydraulic clamping element configured to establish the clamping connection with the rotationally symmetrical body under the action of a hydraulic pressure, wherein the hydraulic clamping element comprises a clamping cylinder and a clamping piston displaceably arranged therein for varying the hydraulic pressure. The first intermediate member may have a continuous central bore extending therethrough along the longitudinal axis. The clamping device may have an actuating element for the clamping piston, which is arranged in the central bore of the first intermediate piece and is axially movable in this bore along the longitudinal axis.

The clamping element may therefore be a hydraulic expansion element with integrated clamping cylinder and clamping piston. The clamping piston may be actuated by an actuating element which may act in compression or tension. This actuating element, which may be rod-shaped, for example, is preferably guided by a first intermediate piece arranged axially between the spindle head and the clamping element. This allows the hydraulic bores to be kept very short. At the same time, a modular assembly is achieved which allows very simple adaptation to different rotating parts. In particular, the first intermediate piece may be configured to allow adaptation to different spindle heads or different base units while providing a standardized interface to the clamping element or another intermediate piece. In particular, the first intermediate piece may provide a standardized interface in one of several predetermined, also standardized sizes to connect the actual clamping element directly or via further intermediate pieces to the first intermediate piece. Thus, only the actual clamping element needs to be configured specifically for the workpiece, while assortments of standardized components can be used for the intermediate pieces.

In some embodiments, the clamping device may comprise:
- a support element for axial support of the rotationally symmetrical body when the rotationally symmetrical body is clamped on the clamping device; and
- a pneumatic seat checking device comprising at least one measurement nozzle arranged in the support element,
- wherein the first intermediate piece has a decentrally extending conduit bore for guiding a measurement fluid, in particular compressed air, for the measurement nozzle.

A first intermediate piece is thus provided, which is located axially between the spindle head and the clamping element. A conduit bore for a measurement fluid, in particular compressed air, may run through the intermediate piece. The supply of the measurement fluid to the measurement nozzle may thus take place through several separately manufactured components arranged axially one behind the other, including the intermediate piece. In each of these components, the required bores can be kept shorter than if the clamping device had a single, one-piece base body. Again, a modular assembly is also achieved, allowing very easy adaptation to different rotating parts and very advantageous standardization.

In advantageous embodiments, the first intermediate piece has a continuous central bore along the longitudinal axis, and the conduit bore opens into this central bore at an opening so that the measurement fluid can be guided through the central bore of the first intermediate piece to the measurement nozzle. A connection conduit for the measurement fluid, which may be formed, for example, by a plurality of bore sections, may then serve to guide measurement fluid that has been guided into the central bore of the first intermediate piece further from this central bore to the measurement nozzle. In this way, the decentrally extending conduit bore in the first intermediate piece can be made particularly short. A central bore in the first intermediate piece may also often be much simpler and safer to make than a decentralized bore.

The clamping device may comprise an actuating element for actuating the clamping element, the actuating element being arranged in the central bore of the first intermediate piece and being axially movable in this bore. The actuating element can be arranged in the bore with radial play in such a way that an annular space remains for the passage of the measurement fluid between the actuating element and a wall portion of the first intermediate piece delimiting the central bore. To reduce the dead volume for the measurement fluid, this annular space is kept as small as possible. Preferably, the annular space has an extension in the radial direction that is nowhere greater than 1 mm, particularly preferably nowhere greater than 0.5 mm. To prevent the measurement fluid from escaping in the proximal direction, a circumferential seal may be formed between the actuating element and the first intermediate piece in a region proximal to the opening.

The clamping element in such embodiments may act hydraulically or mechanically. Preferably, the clamping element is a hydraulic clamping element (hydraulic expansion element) which is configured to establish the clamping connection under the action of a hydraulic pressure. For this purpose, the hydraulic clamping element may comprise a clamping cylinder and a clamping piston displaceably arranged therein for varying the hydraulic pressure, the clamping piston being actuable by the actuating element.

The clamping device may comprise a piston rod acting in conjunction with the clamping piston to displace the clamping piston along the longitudinal axis, the piston rod protruding from the clamping element in a proximal direction. The actuating element is then preferably formed separately from the piston rod and has a distal end that acts in conjunction with the piston rod to displace the piston rod along the longitudinal axis, and a proximal end protruding from the first intermediate piece in the proximal direction to allow actuation of the actuating element. As a result, actuation of the clamping device manufactured according to the invention can ultimately be performed in the same manner as if it were a prior art clamping device, without sacrificing the advantages of the invention.

The clamping element may be configured to establish a clamping connection at the inner circumference of a bore of the rotationally symmetrical body. If the clamping element is a hydraulic clamping element, it may comprise a clamping sleeve for this purpose, which is configured to expand radially under the effect of the hydraulic pressure. This is then also referred to as a hydraulic expansion arbor. The invention makes it possible for the clamping sleeve to at least partially radially surround the clamping cylinder. This results in a particularly short design of the clamping element, with correspondingly short hydraulic bores. If the clamping element is configured to establish the clamping connection at the inner circumference of a bore of the rotationally symmetrical body, the support element is preferably annular and has a larger diameter than the clamping sleeve. However, the clamping element may also be configured to establish the clamping connection in a way other than at the inner circumference of a bore, in particular at an outer circumference of the rotationally symmetrical body. If the clamping element acts hydraulically, this is then referred to as a hydraulic expansion chuck. Accordingly, the support element may have a shape other than that of a ring.

The clamping device may further comprise a second intermediate piece, the second intermediate piece being arranged in axial direction between the first intermediate piece and the clamping element. The first and second intermediate pieces may then perform different functions. For example, the first intermediate piece may provide a standardized interface to the base unit at its proximal end, while having different diameters at its distal end. In turn, the second intermediate piece may have different lengths to allow the length of the clamping device to be adapted to specific needs.

The second intermediate piece also preferably has a continuous central bore along the longitudinal axis, this bore adjoining the continuous central bore of the first intermediate piece in the axial direction. If a measurement fluid is guided through the central bore of the first intermediate piece, it is advantageous if the measurement fluid is subsequently also guided further through the central bore of the second intermediate piece. The actuating element can also extend into the central bore of the second intermediate piece.

Of course, the number of intermediate pieces is not limited, and it is conceivable to provide more than two intermediate pieces. Similar considerations as for the second intermediate piece then apply to the further intermediate pieces.

The clamping device may further comprise a base unit arranged in axial direction between the spindle head and the first intermediate piece. In particular, the base unit may be configured to allow adaptation to different spindle heads while providing a standardized interface to the first intermediate piece.

BRIEF DESCRIPTION OF THE DRAWINGS

Preferred embodiments of the invention are described below with reference to the drawings, which are for explanatory purposes only and are not to be construed in a limiting manner. In the drawings, FIG. 1 a perspective view of a clamping device manufactured according to a method according to an embodiment of the invention, with a workpiece clamped thereon.

DESCRIPTION OF PREFERRED EMBODIMENTS

Structure of a Clamping Device According to an Exemplary Embodiment

Figure 1:
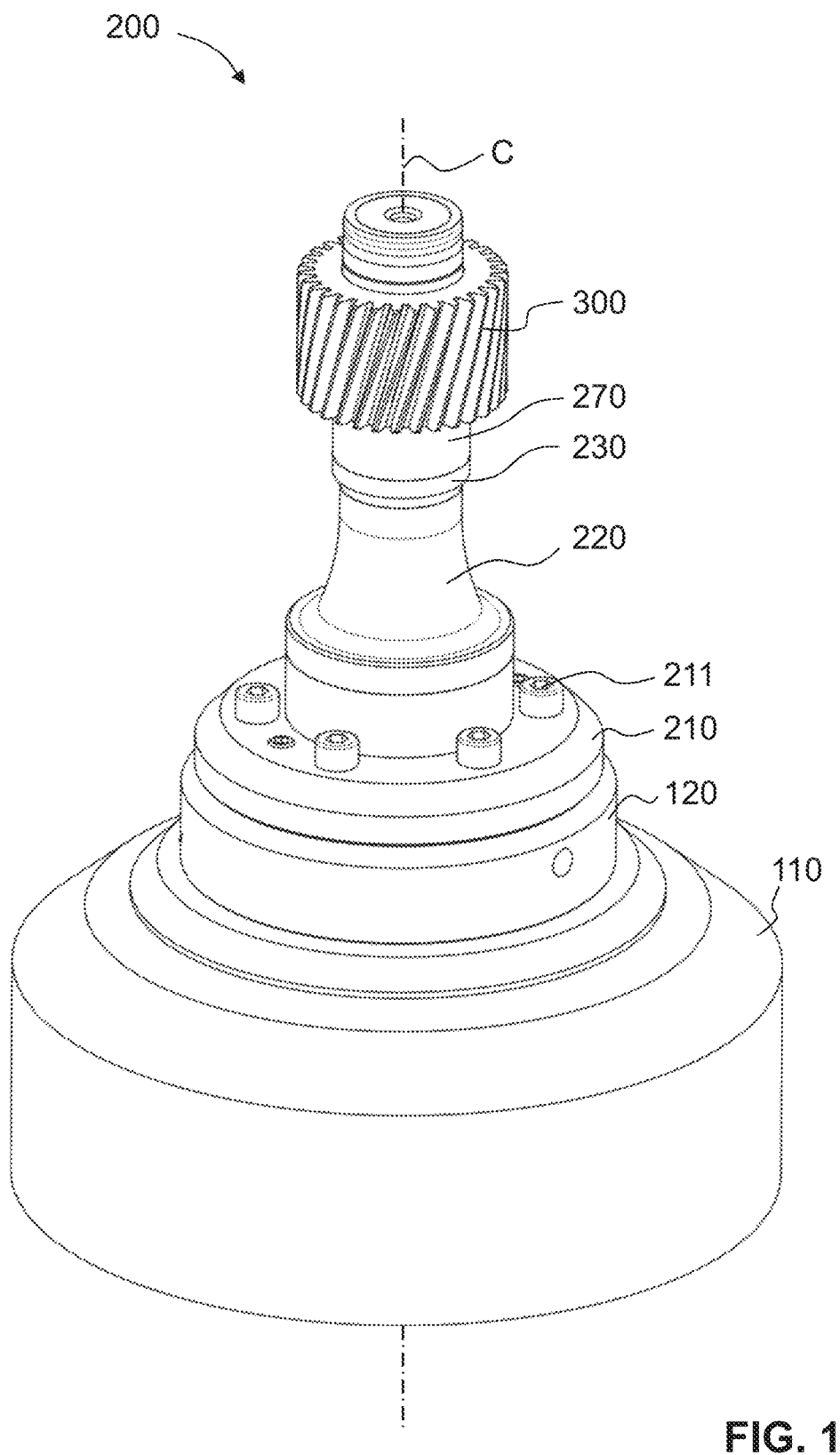
Figure 2:
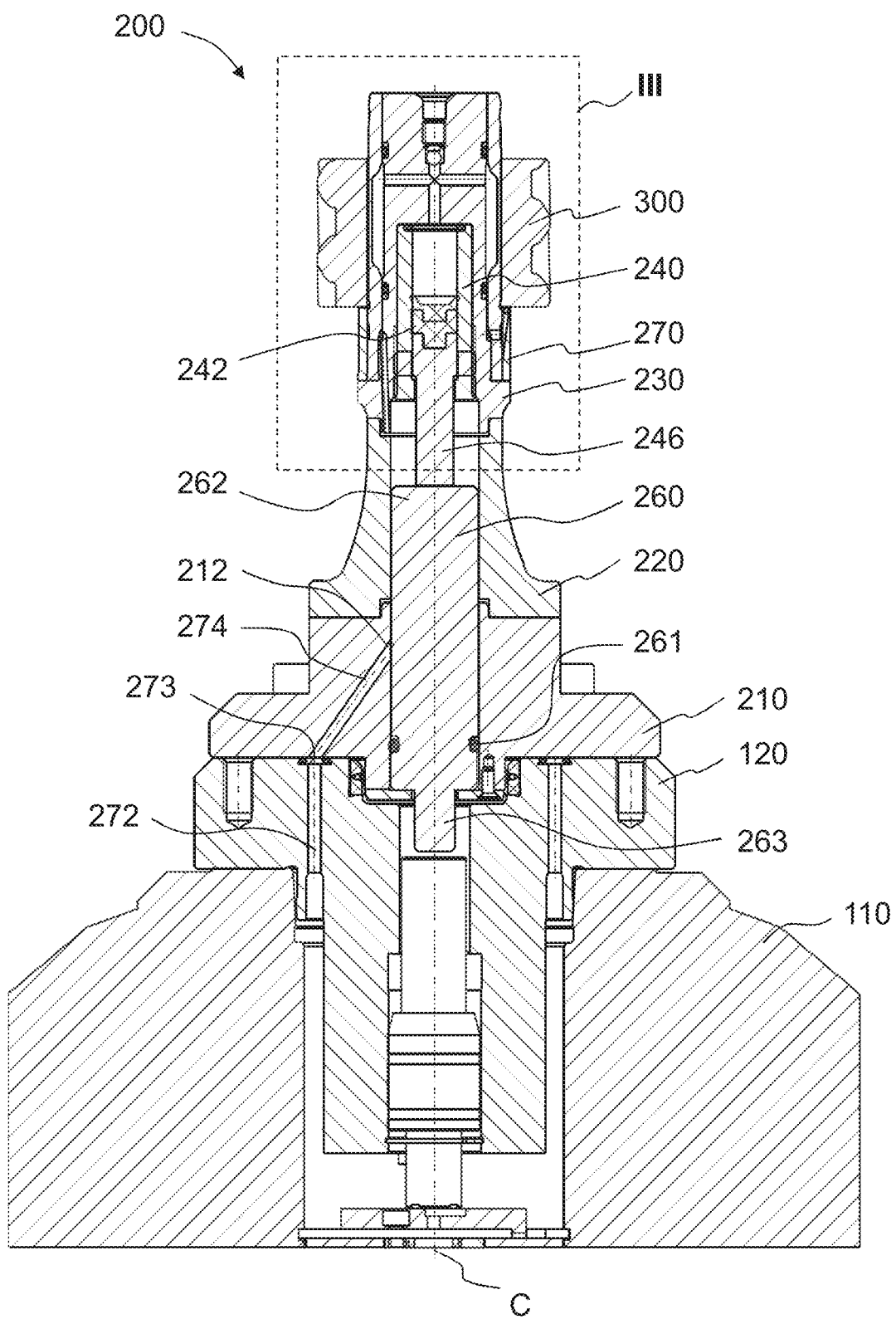
FIG. 2 a central longitudinal section through the clamping device of FIG. 2.
Figure 3:
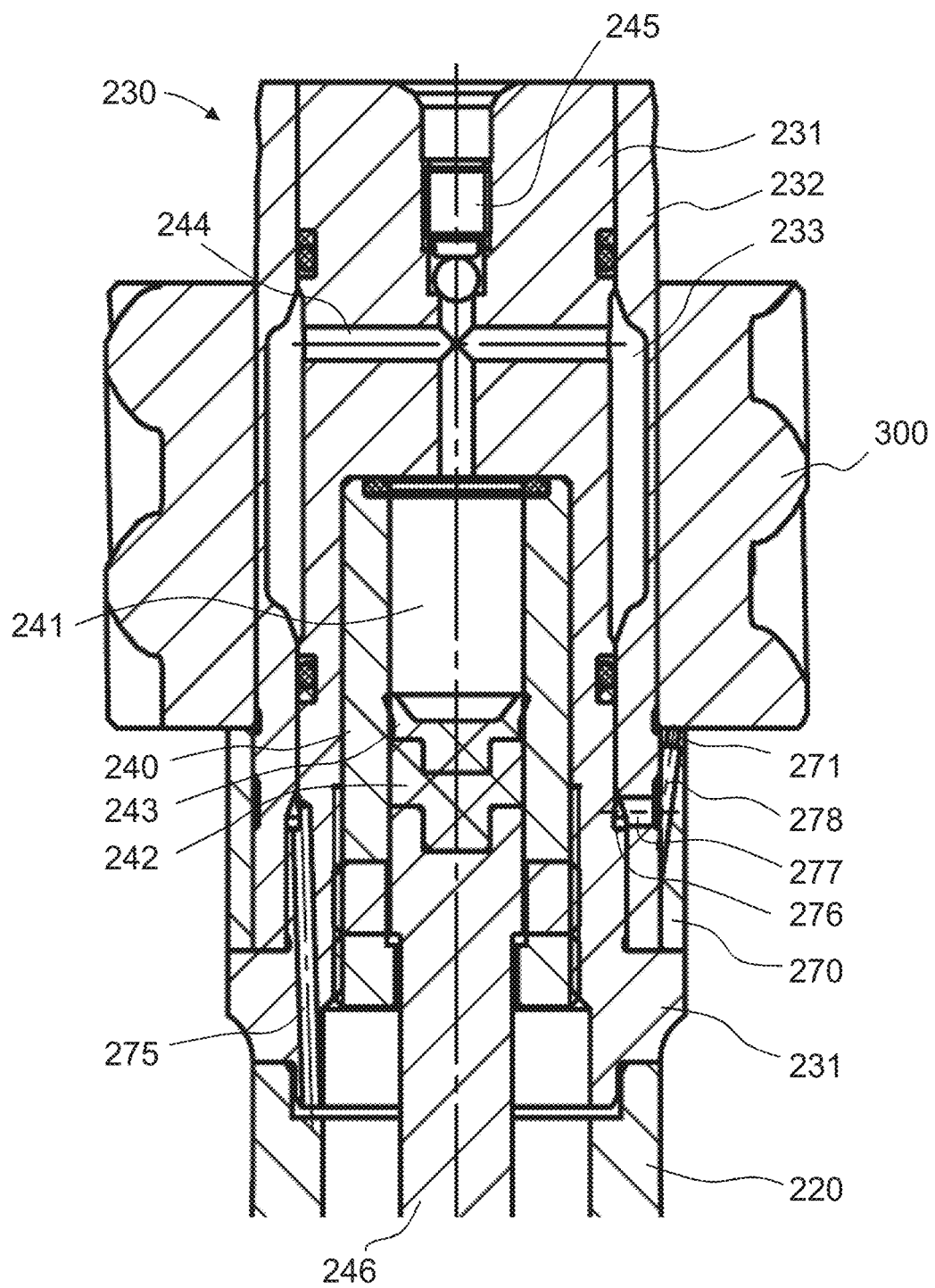
FIG. 3 an enlarged view of section III of FIG. 3.

FIGS. 1 to 3 illustrate a clamping device 200 manufactured according to a method according to an embodiment of the invention.

The clamping device 200 is configured to be driven on a motor spindle for rotation about a longitudinal axis C. The motor spindle has a spindle head 110 on which an optional base unit 120 is mounted. The base unit 120 is rigidly fixed to the spindle head 110 in a non-destructively detachable manner, for example with a quick-clamping system not shown or with screws not shown. The actual clamping device 200 is mounted on the base unit 120. The clamping device 200 has the following components in sequence in axial direction between its spindle-side proximal end and its workpiece-side distal end: a first intermediate piece 120 is mounted on the base unit 120. The first intermediate piece 210 is non-destructively removably fixed rigidly to the base unit 210 with screws 211, but may also be fixed, for example, with a quick-clamping system. A second intermediate piece 220 is rigidly attached to the first intermediate piece 210. The second intermediate piece 220 is permanently connected to the first intermediate piece 210, for example by a welded connection. However, this connection may also alternatively be formed in a non-destructively detachable manner, e.g. as a screw connection. A hydraulic expansion arbor 230 is mounted on the second intermediate piece 220. The hydraulic expansion arbor 230 is again permanently rigidly connected to the second intermediate piece 220, for example by a welded connection, but may also be non-destructively detachably connected to the second intermediate piece. A workpiece 300 having a central bore is clamped on the hydraulic expansion arbor 230. An annular support sleeve 270 radially surrounds a portion of the hydraulic expansion arbor 230 and forms an annular, planar axial support surface for the workpiece 300.

The shape and dimensions of the proximal end of the base unit 120 are largely dictated by the shape and dimensions of the spindle head 110, and are independent of the shape and dimensions of the workpiece to be clamped. At its distal end, the base unit 120 provides a standardized interface for the first intermediate piece 210.

The primary purpose of the first intermediate piece 210 is to provide a match between the radial dimensions of the base unit 210 and the radial dimensions of the subsequent components 220, 230. In the present example, the outer diameter of the first intermediate piece 210 is substantially smaller at the distal end than at the proximal, spindle-side end, and is thus adapted to a predetermined size range of workpieces. The first intermediate piece 210 also plays an important role in guiding compressed air for a pneumatic seat checking device, as will be explained in more detail below. For this purpose, the first intermediate piece has various holes defining a hole pattern at the proximal end.

The primary purpose of the second intermediate piece 220 is to adapt the axial length of the clamping device 200 to the specifications. For example, the position of the workpiece center relative to the end of the spindle head is usually predetermined by the machine design. For an axially elongated workpiece, the second intermediate piece will therefore generally be shorter than for an axially very short workpiece.

The hydraulic expansion arbor 230 is used to fix the workpiece 300 to the clamping device. The structure of the hydraulic expansion arbor 230 is shown in FIG. 3. It comprises a pin-shaped base body 231, which is surrounded by an expansion sleeve 232. The expansion sleeve 232 has at least one wall portion with reduced wall thickness at its outer circumference. Between this wall portion and the base body 231, an expansion chamber 233 is formed which can be pressurized with a hydraulic medium. Under the pressure of the hydraulic medium, the wall portion expands elastically outwardly and thus generates a radially outwardly directed clamping force on the inner wall of the central bore of the workpiece 300. The expansion sleeve 232 is thus deformed in the radial direction by the application of hydraulic pressure. The expansion sleeve interacts with a clamping surface of the workpiece 300 in direction of which the clamping element is deformable.

Pressure Generation

Inside the clamping device 200, various components are arranged to generate hydraulic pressure in the expansion chamber 233. In particular, a hollow clamping cylinder 240 is centrally fitted into the base body 231 of the hydraulic expansion arbor 230. In the present example, the clamping cylinder 240 is partially radially surrounded by the expansion sleeve 232. However, the clamping cylinder 240 may also be arranged axially offset from the expansion sleeve; this is particularly advantageous for small clamping diameters. For this purpose, the hydraulic expansion arbor 230 may exhibit a two-part structure, with two parts being arranged axially one behind the other, the clamping cylinder 240 being arranged in one of these parts and the expansion sleeve 232 being arranged on the other part. A clamping piston 242 with sealing element 243 is guided axially displaceably in the clamping cylinder 240 and together with the clamping cylinder 240 delimits a hydraulic reservoir 241 for the incompressible hydraulic medium, typically a hydraulic oil. Hydraulic bores 244 lead from the hydraulic reservoir 241 to the expansion chamber 233 to guide the hydraulic medium. A fill valve 245 may be used to fill the hydraulic reservoir 241, the hydraulic bores 244, and the expansion chamber 233 with the hydraulic medium.

The base unit 120, the first intermediate piece 210 and the second intermediate piece 220 each have a continuous central axial bore extending therethrough. The central bore ends at the hydraulic cylinder 240 in the hydraulic expansion arbor 230.

The clamping piston 242 is actuated by a piston rod 246 acting by pressure. The piston rod 246 protrudes in proximal direction from the clamping element 230. An actuating element in the form of an actuating rod 260 serves to exert axial mechanical pressure with its distal end 262 on the piston rod 246, and thus on the clamping piston 422, in order to vary the pressure in the clamping cylinder 240. The actuating rod 260 passes through the central bores of the first and second intermediate pieces 210, 220. The proximal end 263 of the actuating rod 260 protrudes axially in the proximal direction from the first intermediate piece 210 and projects into the central bore of the base unit 120. At this protruding end, the actuating rod 260 can be pressed in the distal direction to change the pressure in the hydraulic reservoir 251. This may be done, for example, by a hydraulic actuator not shown in the drawing, which is arranged in the base unit 120.

Between its proximal end 263 and its distal end 262, the actuating rod 260 has an enlarged cylindrical portion. The outer diameter of the enlarged portion is selected such that the actuating rod 260 is slidable with radial play in the central bores of the first and second intermediate pieces 210, 220.

Pneumatic Seat Checking

A pneumatic seat checking device is used to check whether the workpiece 300 has been correctly placed onto the hydraulic expansion arbor 230. The workpiece 300 rests axially on a workpiece support surface of the support sleeve 270. The seat checking device includes one or more measurement nozzles 271 (see FIG. 3) arranged in the workpiece support surface of the support sleeve 270. The measurement nozzles are supplied with compressed air as follows: supply bores 272 for the compressed air supply are provided inside the base unit 120, running parallel to the longitudinal axis C, and may be supplied with compressed air from the spindle head 110. The supply bores 272 terminate in an annular space 273 at the distal end of the base unit 120. The annular space 273 is connected to the central bore of the first intermediate member 210 by a decentralized and oblique conduit bore 274, the conduit bore 274 opening into the central bore at an opening 212. There is sufficient radial clearance between the actuating rod 260 and the inner wall of the central bores in the first and second intermediate pieces 210, 220 to allow the compressed air to continue to pass through said clearance without excessive pressure loss. The compressed air thus enters the bore area immediately proximal to the clamping cylinder 240. From here, oblique connection bore 275 run through the base body 231 of the hydraulic expansion arbor 230 to an annular space 276 on the radially outer side of the base body 231 (see FIG. 3). Radial punctures 277 through the wall of the expansion sleeve 242 and adjoining, oblique nozzle supply bores 278 in the support sleeve 270 finally guide the compressed air to the measurement nozzles 271.

The central bores of the first and second intermediate pieces 210, 220 are sealed in the proximal direction relative to the actuating rod 260 by a sealing ring 261 located proximal to the opening 212. The two intermediate pieces 210, 220 and the base body 231 of the hydraulic expansion arbor 230 are also sealed from each other. In the distal direction, the central bores are sealed by the clamping cylinder 240, which is fitted airtightly into the base body 231 of the hydraulic expansion arbor 230. As a result, no air can undesirably escape from the central bores.

To verify that the workpiece 300 properly rests on the support sleeve 270, compressed air is forced into the supply bores 272, and the flow rate or back pressure of the compressed air is measured. The flow rate and back pressure depend on the distance of the workpiece 300 from the workpiece support surface. When the workpiece 300 fully rests on this support surface, it closes the measurement nozzles 271, causing the flow rate and dynamic pressure to change. In this way, the correct seat of the workpiece can be concluded in a manner known per se.

Manufacturing of a Clamping Device According to an Embodiment of the Invention

Figure 4:
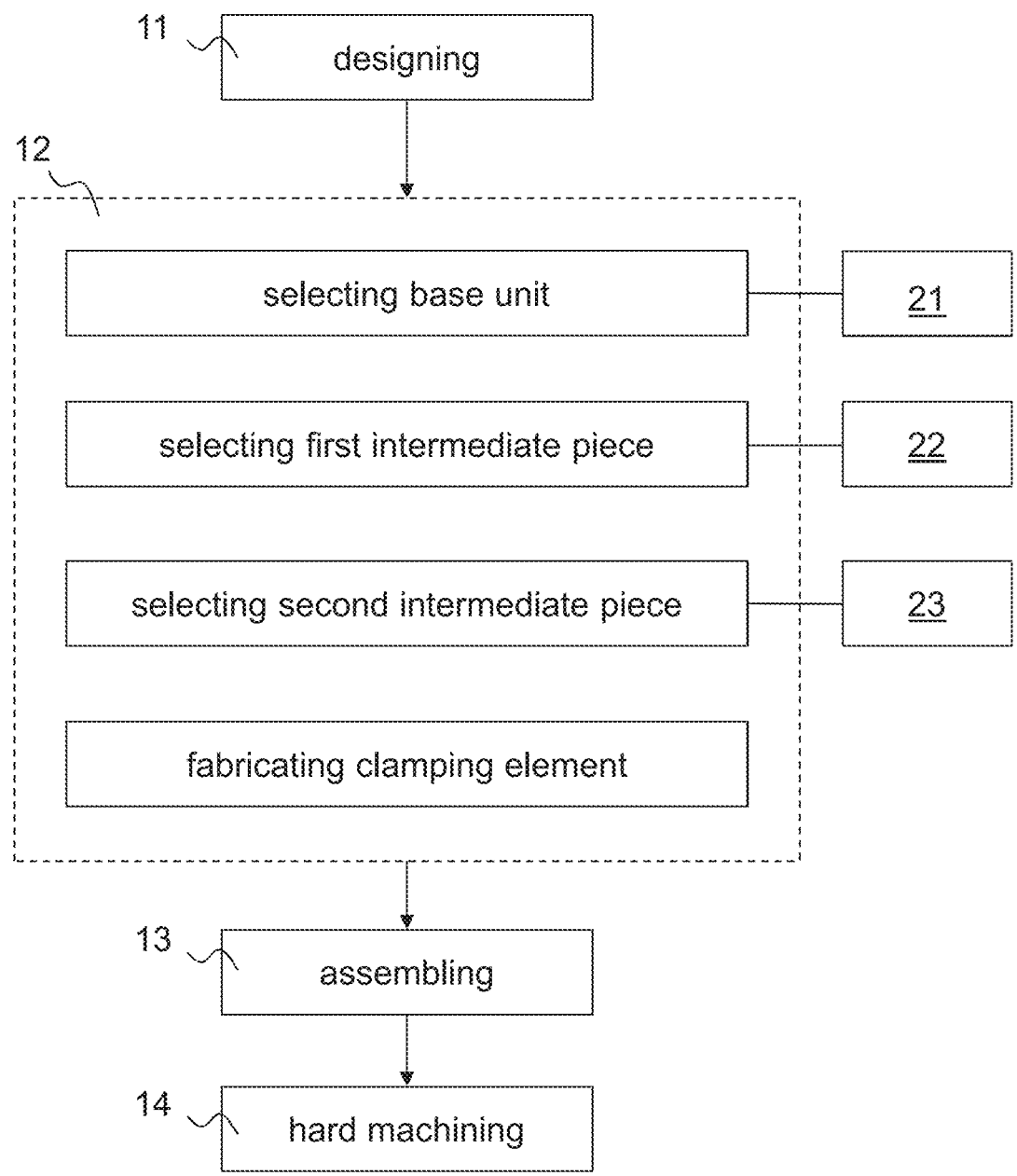
FIG. 4 a schematic flow diagram for a method of manufacturing a clamping device according to an embodiment of the invention.

With reference to FIG. 4, an advantageous method for manufacturing a clamping device according to an embodiment of the invention will now be explained.

The manufacturer provides various assortments of standardized prefabricated components. In particular, the manufacturer provides an assortment 21 of standard base units, an assortment 22 of first standard intermediate units, and an assortment 23 of second standard intermediate units.

Each standard base unit in the assortment 21 has at its proximal end one of a plurality of different interfaces to different spindle heads and at its distal end one of a plurality of standardized interfaces to the first intermediate piece. Accordingly, each of the first standard intermediate units in the assortment 22 have at their proximal end one standardized interface to the base unit and at their distal end one standardized interface to a second intermediate unit or to a clamping element. Each of the second standard intermediate pieces in the assortment 23 is adapted at its proximal end to the standardized interfaces of the first standard intermediate pieces. At its distal end, the second standard intermediate piece provides a standardized interface to a clamping element. The standardized interfaces may differ, for example, with respect to their dimensions and hole pattern.

When designing the clamping device (step 11), the design engineer considers the available standard base units and standard intermediate pieces in assortments 21, 22 and 23 and designs a workpiece-specific clamping element. For manufacturing, a matching base unit from assortment 21, a matching first intermediate piece from assortment 22, and a matching second intermediate piece from assortment 23 are then selected, and the workpiece-specific clamping element is fabricated (step 12). These components are then assembled (step 13) and hard machined (step 14).

The base unit may also be omitted. In this case, the first intermediate piece is mounted directly on the spindle head. Instead of two intermediate pieces, only one intermediate piece may be used, or more than two intermediate pieces may be provided.

Clamping Device According to Prior Art

Figure 5:
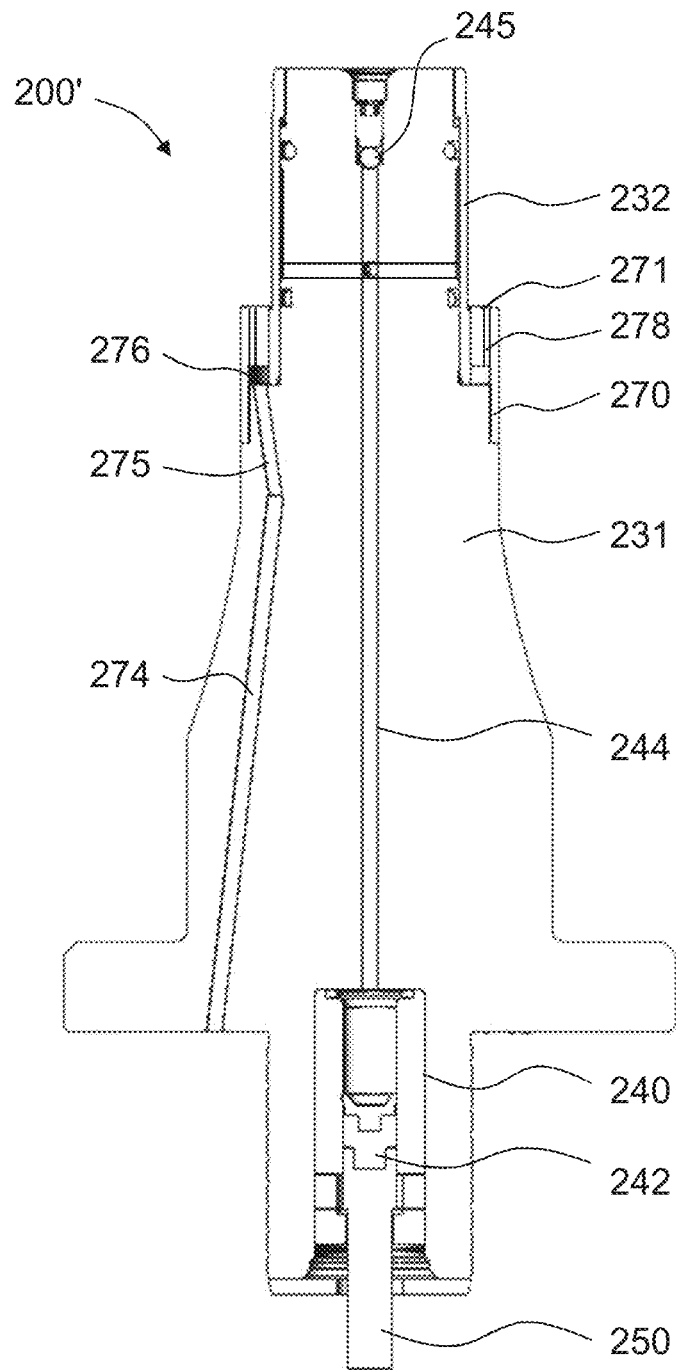
FIG. 5 a schematic central longitudinal section through a clamping device of the prior art.

FIG. 5 shows an example of a prior art clamping device 200'. This clamping device largely corresponds in its mode of operation to the clamping device 200 of the embodiment example explained above, but differs from the latter in its structure. Elements acting similarly are marked with the same reference signs as in FIGS. 1 to 3.

Unlike in the embodiment example explained above, there are no intermediate pieces 210, 220, but the clamping device 200' directly forms a hydraulic expansion arbor, the base body 231 of which extends in one piece from the expansion sleeve 232 to the proximal end of the clamping device 200'. The clamping cylinder 240 with the clamping piston 242 displaceably arranged therein is located in this base body 231 close to the proximal end of this base body 231, relatively far from the expansion sleeve 232. Accordingly, the hydraulic bores 244 are much longer than in the embodiment example explained above. As a result, the hydraulic bores 244 are more difficult to manufacture, require more hydraulic fluid, and are also more difficult to vent.

In addition, unlike in the embodiment example explained above, the conduit bore 274 and the connection bore 275 of the seat checking device do not lead to the central bore of an intermediate piece, but are directly connected to each other in a decentralized manner. In particular, the conduit bore 274 is thus considerably longer than in the embodiment example explained above and correspondingly more difficult to manufacture, especially since the two obliquely extending bores 274, 275 must meet exactly in the interior of the base body 241.

Advantages of the Invention

From a comparison of the embodiment explained above with the prior art clamping device, the following becomes clear:

a) The modular design of the clamping device with several flexibly usable, standardized components arranged axially one behind the other enables simple adaptation to different types of workpieces. It is no longer necessary to manufacture the entire clamping device specifically for the workpiece, but it is sufficient to configure only the hydraulic expansion arbor 230 specifically for the workpiece. The components arranged between the spindle head 110 and the hydraulic expansion arbor 230, in particular the base unit 120 and the intermediate pieces 210, 220, may be manufactured and provided in a standardized manner. For example, it is sufficient to provide a small assortment of base units with a single type per motor spindle type. It is also sufficient to provide limited assortments of first and second intermediate pieces 210, 220 in a few standardized sizes to achieve the necessary adjustments of diameter and length. The production risk is thus greatly reduced. Only a few differently dimensioned versions of the standardized components need to be kept in stock to cover a wide range of possible workpiece shapes and workpiece dimensions. The manufacturing of clamping devices is greatly simplified by this modular system, and the time required between order receipt and delivery is massively reduced.

b) By moving the clamping cylinder 240 far toward the distal end of the clamping device compared to the prior art, the hydraulic bores 244 can be kept very short. This greatly simplifies the manufacturing process. The volume of hydraulic fluid required is also significantly reduced, and filling and venting is simplified. The reduced volume also reduces effects caused by the finite compressibility of the hydraulic medium. In practice, a hydraulic medium is not completely incompressible. The finite compressibility of the medium is particularly noticeable in that a much larger stroke of the clamping piston is required than would be the case with an incompressible medium. This disadvantageous effect is markedly reduced by the reduced volume.

c) By routing the compressed air for the pneumatic seat checking in at least one section through a central bore of one or more components of the clamping device, the required separate bores for the compressed air supply can be kept very short. This applies in particular to the oblique bores 274, 275, which are tricky from a manufacturing point of view.

Modifications

While the invention has been explained above by way of an example of an embodiment, many variations are possible without leaving the scope of the invention. For example, instead of a hydraulic expansion arbor, a purely mechanically expanding expansion element may also be used. In particular, the pneumatic seat checking device explained above may also be implemented with very short bores using a mechanical expansion element. However, a pneumatic seat checking device may also be omitted.

Clamping elements other than those acting radially outward are also conceivable, for example clamping elements acting radially inward as a chuck.

The clamping element does not necessarily have to be actuated by a pressure-acting actuating rod. Instead, it is also conceivable to configure the clamping element so that it may be actuated using tension. In this case, instead of an actuating rod acting by pushing, a rod acting by pulling may be provided to actuate the clamping piston.

The clamping device may be configured as a passive clamping device in a manner known per se, so that it provides its clamping force without the application of external force and instead the release is effected by applying a force. In the case of a hydraulically acting clamping element, the clamping piston may be preloaded with a spring element to generate the clamping force, and a rod acting by pushing or pulling serves to counteract the spring preload in order to release the clamping force.

A clamping device manufactured according to the invention may be used not only for clamping toothed workpieces on a workpiece spindle of a gear cutting machine, but also, for example, for clamping any rotating workpieces on a workpiece spindle of another type of machine tool or on a drive spindle of a measuring machine. It is also conceivable in principle to construct a tool clamping device according to the concept of the invention. In this respect, the invention is not limited to a specific type of rotating body to be clamped.

A variety of further variations are possible without leaving the scope of the invention.

The invention claimed is:

1. A method of manufacturing a modular clamping device for clamping a rotationally symmetrical body on a spindle head of a motor spindle to drive the rotationally symmetrical body to rotate about a longitudinal axis of the clamping device, the modular clamping device comprising a clamping element configured to establish a clamping connection with the rotationally symmetrical body and a first intermediate piece, the method comprising the steps of:
providing a first intermediate piece assortment comprising a plurality of prefabricated, standardized first standard intermediate pieces, each of said first standard intermediate pieces having a proximal end and a distal end, wherein each of said first standard intermediate pieces provides at its proximal end an interface to the spindle head or to a base unit arranged on the spindle head, and wherein each of the first standard intermediate pieces provides at its distal an interface end for a second intermediate piece;
selecting a desired first intermediate piece from the first intermediate piece assortment;
manufacturing the clamping element;
arranging the selected first intermediate piece relative to the clamping element in such a way that the selected first intermediate piece is arranged in axial direction with respect to the longitudinal axis between the spindle head and the clamping element when the clamping device is mounted to the spindle head; and
providing a second intermediate piece assortment comprising a plurality of prefabricated, standardized second standard intermediate pieces, each of said second standard intermediate pieces having a proximal end and a distal end, wherein each of the second standard intermediate pieces provides an interface at its proximal end to one of the first standard intermediate pieces of the first intermediate piece assortment, and wherein each of the second standard intermediate pieces provides an interface for the clamping element or for a further intermediate piece;
selecting a desired second intermediate piece from the second intermediate piece assortment; and
arranging the selected second intermediate piece in axial direction between the selected first intermediate piece and the clamping element,
wherein the clamping device comprises a support element for axially supporting the rotationally symmetrical body when the rotationally symmetrical body is clamped on the clamping device,
wherein the clamping device comprises a pneumatic seat checking device comprising at least one measurement nozzle arranged in the support element,
wherein the first intermediate piece has a decentrally extending conduit bore for guiding a measurement fluid for the measurement nozzle,
wherein the first intermediate piece comprises a continuous central bore along the longitudinal axis,
wherein the conduit bore opens into the central bore of the first intermediate piece at an opening, so that the measurement fluid can be guided through the central bore of the first intermediate piece to the measurement nozzle,
wherein the clamping device comprises an actuating element for actuating the clamping element, and
wherein the actuating element is arranged in the central bore of the first intermediate piece and is axially movable along the central longitudinal axis in the central bore.

2. The method of claim 1, wherein the interfaces at at least one of the proximal or distal end of the first intermediate pieces differ within the first intermediate piece assortment.

3. The method of claim 1, wherein the first intermediate piece has a continuous central bore along the longitudinal axis, and
wherein the second intermediate piece has a continuous central bore along the longitudinal axis that adjoins the continuous central bore of the first intermediate piece in axial direction.

4. The method of claim 1, wherein the modular clamping device further comprises a base unit,
the method further comprising the steps of:
providing a base unit assortment comprising a plurality of prefabricated standardized base units, each of the standard base units having a proximal end and a distal end, wherein each of the standard base units provides an interface to the spindle head at its proximal end, and wherein each of the standard base units provides an interface to a first standard intermediate piece from the first intermediate piece assortment at its distal end;
selecting the base unit from the base unit assortment; and
arranging the selected base unit relative to the first intermediate piece such that the base unit is arranged in axial direction between the spindle head and the first intermediate piece when the clamping device is mounted to the spindle head.

5. The method of claim 1, wherein the clamping element is a hydraulic clamping element configured to establish the clamping connection with the rotationally symmetrical body under the action of a hydraulic pressure, wherein the hydraulic clamping element comprises a clamping cylinder and a clamping piston displaceably arranged therein for varying the hydraulic pressure,
wherein the first intermediate piece has a continuous central bore along the longitudinal axis, and
wherein the clamping device comprises an actuating element for the clamping piston, the actuating element being arranged in the central bore of the first intermediate piece and being axially movable along the longitudinal axis in the central bore.

6. The method of claim 5,
wherein the modular clamping device further comprises:
a piston rod acting in conjunction with the clamping piston to displace the clamping piston along the longitudinal axis, wherein the piston rod protrudes from the clamping element in a proximal direction,
wherein the actuating element has a distal end that acts in conjunction with the piston rod to displace the piston rod along the longitudinal axis, and
wherein the actuating element has a proximal end that protrudes in the proximal direction from the first intermediate piece to allow actuation of the actuating element.

7. The method of claim 1, wherein the clamping device comprises at least one connection conduit for the measurement fluid, wherein the at least one connection conduit is configured to guide measurement fluid that has been guided into the central bore of the first intermediate piece to the measurement nozzle.

8. The method of claim 1,
wherein the actuating element is arranged in the central bore of the first intermediate piece with radial play in such a way that an annular space remains for the passage of the measurement fluid between the actuating element and a wall portion of the first intermediate piece delimiting the central bore, and
wherein a circumferential seal is formed between the actuating element and the first intermediate piece proximal to the opening to prevent the measurement fluid from escaping in the proximal direction.

9. The method of claim 1,
wherein the clamping element is a hydraulic clamping element configured to establish the clamping connection under the action of a hydraulic pressure,
wherein the hydraulic clamping element comprises a clamping cylinder and a clamping piston displaceably arranged therein for varying the hydraulic pressure, and
wherein the clamping piston is actuable by the actuating element.

10. The method of claim 9,
wherein the modular clamping device further comprises:
a piston rod acting in conjunction with the clamping piston to displace the clamping piston along the longitudinal axis, wherein the piston rod protrudes from the clamping element in a proximal direction,
wherein the actuating element has a distal end that acts in conjunction with the piston rod to displace the piston rod along the longitudinal axis, and
wherein the actuating element has a proximal end that protrudes in the proximal direction from the first intermediate piece to allow actuation of the actuating element.

11. The method of claim 1, comprising:
mounting the clamping device on the spindle head in such a way that the first intermediate piece is arranged between the spindle head and the clamping element in the axial direction with respect to the longitudinal axis.

12. A method of manufacturing a modular clamping device for clamping a rotationally symmetrical body on a spindle head of a motor spindle to drive the rotationally symmetrical body to rotate about a longitudinal axis of the clamping device, the modular clamping device comprising a clamping element configured to establish a clamping connection with the rotationally symmetrical body and a first intermediate piece,
the method comprising the steps of:
providing a first intermediate piece assortment comprising a plurality of prefabricated, standardized first standard intermediate pieces, each of said first standard intermediate pieces having a proximal end and a distal end, wherein each of said first standard intermediate pieces provides at its proximal end an interface to a base unit arranged on the spindle head, and wherein each of the first standard intermediate pieces provides at its distal an interface end for a second intermediate piece;
selecting a desired first intermediate piece from the first intermediate piece assortment;
manufacturing the clamping element;
providing a base unit assortment comprising a plurality of prefabricated standardized base units, each of the standard base units having a proximal end and a distal end, wherein each of the standard base units provides an interface to the spindle head at its proximal end, and wherein each of the standard base units provides an interface to a first standard intermediate piece from the first intermediate piece assortment at its distal end;
selecting a desired base unit from the base unit assortment;
arranging the first intermediate piece relative to the clamping element in such a way that the first intermediate piece is arranged in axial direction with respect to the longitudinal axis between the spindle head and the clamping element when the clamping device is mounted to the spindle head;
arranging the selected base unit relative to the first intermediate piece such that the base unit is arranged in axial direction between the spindle head and the first intermediate piece when the clamping device is mounted to the spindle head,
wherein the clamping device comprises a support element for axially supporting the rotationally symmetrical body when the rotationally symmetrical body is clamped on the clamping device,
wherein the clamping device comprises a pneumatic seat checking device comprising at least one measurement nozzle arranged in the support element,
wherein the first intermediate piece has a decentrally extending conduit bore for guiding a measurement fluid for the measurement nozzle,
wherein the first intermediate piece comprises a continuous central bore along the longitudinal axis,
wherein the conduit bore opens into the central bore of the first intermediate piece at an opening, so that the measurement fluid can be guided through the central bore of the first intermediate piece to the measurement nozzle, wherein the clamping device comprises at least one connection conduit for the measurement fluid, wherein the at least one connection conduit is configured to guide measurement fluid that has been guided into the central bore of the first intermediate piece to the measurement nozzle, wherein the clamping device comprises an actuating element for actuating the clamping element, and wherein the actuating element is arranged in the central bore of the first intermediate piece and is axially movable along the central longitudinal axis in the central bore.

13. The method of claim 12, wherein the interfaces at at least one of the proximal or distal end of the first intermediate pieces differ within the first intermediate piece assortment.

14. The method of claim 12, wherein the actuating element is arranged in the central bore of the first intermediate piece with radial play in such a way that an annular space remains for the passage of the measurement fluid between the actuating element and a wall portion of the first intermediate piece delimiting the central bore, and wherein a circumferential seal is formed between the actuating element and the first intermediate piece proximal to the opening to prevent the measurement fluid from escaping in the proximal direction.

15. The method of claim 12, wherein the clamping element is a hydraulic clamping element configured to establish the clamping connection under the action of a hydraulic pressure, wherein the hydraulic clamping element comprises a clamping cylinder and a clamping piston displaceably arranged therein for varying the hydraulic pressure, and wherein the clamping piston is actuable by the actuating element.

* * * * *